(12) United States Patent
Abele et al.

(10) Patent No.: US 10,672,349 B2
(45) Date of Patent: Jun. 2, 2020

(54) DEVICE FOR PROJECT AN IMAGE (71) Applicant: North Inc., Kitchener (CA)

(72) Inventors: Nicolas Abele, Demoret (CH); Lucio Kilcher, Montreux (CH)

(73) Assignee: North Inc., Kitchener, Ontario (CA)

( * ) Notice: Subject to any disclaimer, the term of this patent is extended or adjusted under 35 U.S.C. 154(b) by 0 days.

(21) Appl. No.: 16/248,366

(22) Filed: Jan. 15, 2019

(65) Prior Publication Data

US 2019/0147807 A1    May 16, 2019

Related U.S. Application Data

(63) Continuation of application No. 15/729,484, filed on Oct. 10, 2017, now Pat. No. 10,210,818, which is a continuation of application No. 13/782,509, filed on Mar. 1, 2013, now Pat. No. 9,786,230, which is a continuation of application No. PCT/EP2011/065184, filed on Sep. 2, 2011, and a continuation of application No. PCT/EP2010/063327, filed on Sep. 10, 2010.

(51) Int. Cl.
*G09G 3/34* (2006.01)
*G06F 3/14* (2006.01)
*G09G 3/02* (2006.01)

(52) U.S. Cl.
CPC ......... *G09G 3/3406* (2013.01); *G06F 3/1446* (2013.01); *G09G 3/02* (2013.01); *G09G 3/346* (2013.01); *G09G 2356/00* (2013.01)

(58) Field of Classification Search
CPC ........ G09G 3/3406; G09G 3/02; G09G 3/346; G09G 2356/00; G06F 3/1446
See application file for complete search history.

(56) References Cited

U.S. PATENT DOCUMENTS

| 5,528,263 A | 6/1996 | Platzker et al. |
| 6,193,375 B1 | 2/2001 | Nagata et al. |
| 6,309,072 B1 | 10/2001 | Deter |
| 6,538,705 B1 | 3/2003 | Higurashi et al. |

(Continued)

FOREIGN PATENT DOCUMENTS

| EP | 1275998 | 1/2003 |
| EP | 1681861 | 7/2006 |

(Continued)

OTHER PUBLICATIONS

European Communication issued in European Application No. 117522144.4 dated Apr. 24, 2018, 5 pages.

(Continued)

*Primary Examiner* — Abhishek Sarma
(74) *Attorney, Agent, or Firm* — Thomas Mahon (57) ABSTRACT

According to the present invention there is provided a projection device, which is configured to project an image which is co-operable with images projected by one or more other projection devices, wherein the projection device comprises a detector operable to detect characteristics of images projected on a display surface by the projection device and one or more other projection devices, and a controller operable to adjust the projection device and/or to adjust one or more of the other projection devices, based on the characteristics of the images detected by the detector, such that the images projected by each projection device co-operate on the display surfaces.

20 Claims, 6 Drawing Sheets

(56) References Cited

U.S. PATENT DOCUMENTS

| | | |
|---|---|---|
| 6,709,116 B1 | 3/2004 | Raskar et al. |
| 6,729,733 B1 | 5/2004 | Raskar et al. |
| 2001/0024326 A1 | 9/2001 | Nakamura et al. |
| 2002/0024640 A1 | 2/2002 | Lokat |
| 2004/0184011 A1 | 9/2004 | Raskar et al. |
| 2008/0143969 A1 | 6/2008 | Aufranc et al. |
| 2008/0212040 A1 | 9/2008 | Aksyuk |
| 2009/0185251 A1 | 7/2009 | Chen et al. |
| 2009/0257031 A1 | 10/2009 | Carroll |
| 2010/0010337 A1 | 4/2010 | Fless |
| 2011/0013249 A1 | 1/2011 | Desai |
| 2011/0309999 A1 | 12/2011 | Chang et al. |
| 2012/0007845 A1 | 1/2012 | Tsuida |
| 2013/0176351 A1 | 7/2013 | Abele et al. |
| 2013/0229580 A1 | 9/2013 | Ishibashi et al. |
| 2014/0016041 A1 | 1/2014 | Kim et al. |
| 2017/0127032 A1 | 5/2017 | Takahashi et al. |

FOREIGN PATENT DOCUMENTS

| | | |
|---|---|---|
| WO | WO2010/116837 | 10/2010 |
| WO | WO2012/031636 | 3/2012 |
| WO | WO2012/031983 | 3/2012 |

OTHER PUBLICATIONS

International Search Report and Written Opinion issued in PCT Application No. PCT/EP2011/065184 dated Jan. 2012, 8 pages.

International Preliminary Report and Written Opinion issued in PCT Application No. PCT/EP2011/065184 dated Mar. 12, 2013, 5 pages.

International Search Report and Written Opinion issued in PCT Application No. PCT/EP2010/063327, dated Nov. 10, 2011, 15 pages.

International Preliminary Report and Written Opinion issued in PCT Application No. PCT/EP2010/063327, dated Mar. 12, 2013, 10 pages.

DEVICE FOR PROJECT AN IMAGE

CROSS REFERENCE TO RELATED APPLICATIONS

This application is a continuation of U.S. patent application Ser. No. 15/729,484, filed Oct. 10, 2017 (now U.S. Pat. No. 10,210,818, issued Feb. 19, 2019), which is a continuation of U.S. patent application Ser. No. 13/782,509, filed Mar. 1, 2013 (now U.S. Pat. No. 9,786,230, issued Oct. 10, 2017), which is a continuation of international application No. PCT/EP2011/065184, filed Sep. 2, 2011, the entire content of these applications being hereby incorporated by reference. U.S. patent application Ser No. 13/782,509 is also a continuation of PCT Application PCT/EP2010/063327, filed Sep. 10, 2010.

BACKGROUND OF THE INVENTION

1. Field of the Invention

The present invention relates to a device for projecting an image, in particular, but not exclusively, to a device for projecting an image of increased brightness and/or of increased size, wherein the image can be projected as a 2-D image or a 3-D image.

2. Description of the Related Art

A MEMS micro-mirror device is a device that contains a Micro-Electrical-Mechanical-System with a reflective surface. The optical MEMS may comprise a cylindrical, elliptical, rectangular or square micro-mirror that is adapted to move and to deflect light over time. The micro-mirror is connected by suspended arms to a fixed part and can tilt and oscillate along one or two axis. For example it can oscillate vertically and horizontally. Different actuation principles can be used, including electrostatic, thermal, electro-magnetic or piezoelectric. MEMS devices are known in which the area of these micro-mirrors are around a few mm2. In this case, the dimensions of the MEMS device, comprising the packaging, is around ten mm2. This device is usually made of silicon, and can be encapsulated in a package that can include the driving actuation electronics. Various optical components, such as for example lenses, beam combiner, quarter-wave plates, beam splitter and laser chips, are assembled with the packaged MEMS to build a complete device.

A typical application of the MEMS micro-mirror devices is for projection devices. In a projection device, a 2-D image or a video can be displayed on any type of surface. In a color device, each pixel is generated by combining modulated red, green and blue laser light sources, by means of, for example, a beam combiner. A MEMS micro-mirror device directs the light of the laser light source to a projection surface and reproduces the image, or the video, pixel-by-pixel. By means of its oscillations, the micro-mirror within the device will continuously scan from left to right and from top to bottom, or according to a different trajectory including e.g., Lissajou trajectories, so that each pixel of the 2-D image is displayed on the screen.

Typically, the micro-mirror of a MEMS micro-mirror device is able to oscillate along one axis. Therefore, in order to display a 2-D image on a screen a projection device will require two MEMS micro -mirror devices; a first MEMS micro-mirror device is required to deflect light along the horizontal image axis and a second MEMS micro-mirror device is required to deflect light along the vertical image axis. During operation, the micro-mirror of the first MEMS micro-mirror device receives light from the beam combiner and deflects the light to the micro-mirror of the second MEMS micro-mirror device. The micro-mirror of the second MEMS micro-mirror device will in turn deflect the light to the display surface where it will appear as a pixel. The micro-mirror of the first MEMS micro-mirror device will oscillate to scan the light along the horizontal image axis thereby displaying the first row of pixels on the display surface. The micro-mirror of the second MEMS micro-mirror device will oscillate about its oscillatory axis so that light received from the micro-mirror of the first MEMS micro-mirror device is scanned along the vertical image axis. The combined effect of the oscillating micro-mirrors is that the light from the beam combiner is scanned in a zig-zag or raster pattern along the display surface. The process is continuous so that a complete image is visible to the viewer on the display surface. The first and the second MEMS micro-mirror devices are precisely positioned such that the oscillatory axes of the respective micro-mirrors are orthogonal; this ensure that all the light received by the micro-mirror of the first MEMS micro-mirror device will be deflected to the micro-mirror of the second MEMS micro-mirror device as the micro mirrors oscillate.

Other MEMS micro-mirror devices comprise a micro-mirror which can oscillate along two orthogonal axes. Such a micro-mirror can scan the light beam in two dimensions. Therefore, to display a 2-D image on a display surface a single mirror will oscillate about two axes to scan the light in a zig-zag, Lissajou or raster pattern over the display surface. Various methods of oscillating the micro-mirrors are employed. For example, an electrostatic means; thermal means; electro-magnetic means, or piezoelectric means.

Projection devices in general are used to project images or videos onto a display surface. The quality of the image projected by a projection device is dependent on the brightness of the image; in contrast to a bright image, the detail of a dull image will not be visible when projected on the display surface. Accordingly it is advantageous to display a bright image on the display surface so that the detail of the image will be visible. However, in projection devices the brightness of the image projected on the display surface is limited by the brightness of the light which can be provided by the light source of the projection device. The brightness of the light which can be provided by a light source is limited by the electrical capabilities of the light source (e.g., the wattage of a light-bulb, LED or laser diode in the light source). Consequently, there exists a maximum brightness at which a projection device can display an image. There is a need in the art for a means and method which will enable increasing the brightness of an image which does not require modification of the projection device.

The dimensions of an image projected by a projection device onto a display surface are also limited. To increase the size of the image projected onto a display surface requires adjustment of a focus lens of the projection device such the light corresponding to each pixels is spread over a larger area of the display surface. Increasing the size of the image will compromise the quality of the image as the sharpness, the pixel density and the brightness of the image will decrease. There is a need in the art for a means and method for enabling enlargement of a projected image without compromising the quality of the image.

Additionally, there is a need in the art for a simplified means which will enable increasing the brightness of an image and/or enabling enlargement of a projected image.

US20090257031 discloses the use of a microprocessor to physically move two projectors so that their projected images are aligned on the display screen. Precise positioning of the projectors relative to one another is difficult to achieve. Furthermore, the device of US20090257031 requires that the projectors are connected by means of a linkage so as to allow the microprocessor to position the projectors relative to one another to achieve the desired alignment of images. Thus, the device disclosed in US20090257031 does not permit the projectors to be independent from one another.

It is an aim of the present invention to obviate or mitigate one or more of the aforementioned disadvantages.

SUMMARY OF THE INVENTION

According to a first aspect of the present invention there is provided a method for projecting an image onto a display surface, comprising the steps of:

a. providing two or more projection devices;

b. arranging the two or more projection devices such that they each project an image on a display surface;

c. off-setting an oscillating reflective surface within at least one of the two or more projection devices such that the image projected by each of the two or more projection devices are in co-operation on the display surface.

The two or more projection devices may be independent of one another.

Each projection device is configured to project the same image content. Each projection device is configured to project the same image.

Each projection device is configured to project part of a complete image.

When each projection device is configured to project the same image, the two or more projection devices are each configured such that the image projected by each of the two or more projection devices co-operate by overlapping. When the images projected by each of the projection device overlap, the overall brightness of the image visible on the display surface is increased. The overlapping of the images on the display surface allows the light projected by each projection device to be combined on the display surface, thereby providing a brighter image. For example, a first projection device may be configured to project an image onto a display surface; a second projection device may be configured to project the same image onto the same position on the display surface. The light projected by the second projection device is superposed on the image projected by the first projection device so that a brighter image is visible on the display surface.

When each projection device is configured to project part of a complete image, the two or more projection devices are each configured such that the image projected by each of the two or more projection devices co-operate by aligning. Aligning the images enables the image projected by the two or more plurality of projection devices to be combined to form a single larger image on the display surface. For example, a first projection device may project an image which forms a first half of a complete image and a second projection device may project an image which form a second half of a complete image, the first and second projection devices may each be configured such that the images they project co-operate by aligning on the display surface. When the first half of the complete image and the second half of the complete image are in alignment, a complete image will be visible on the display surface. The complete image will be larger than an image of the same quality which could be projected by any one of the projections devices alone. Advantageously, unlike 'video-walls' there is no border between the images projected by each projection device, so a complete image which is without gaps, borders or spaces, will be visible on the display surface.

According to a variant of the present invention the two or more projection devices may each project an image, wherein the image projected by each projection device comprises a portion of the resolution of a complete image to be displayed on the display surface. The two or more projection devices may be configured such that the image projected by each of the projection device co-operate by meshing. For example, each of the projection devices may project an image, wherein the image projected by each projection device comprises a portion of the pixels required to display a complete image, to be displayed on the display surface. The images projected by each of the projection devices co-operate on the display screen to display an image of improved resolution. Advantageously, with 'N' projectors with a defined resolution, an image of 'N' times higher resolution can be displayed on the display surface. For example, a first projection device may project a first image on the display surface, the first image comprising half of the pixels of the complete image to be displayed on the display screen. A second projection device may project a second image on the display surface, the second image comprising the other half of the pixels of the complete image to be displayed on the display surface. Both projection devices are configured such that the image projected by each projection device co-operate by meshing on the display surface, to display a complete image on the display surface. The meshing of the first and second images ensures that successive pixels of the complete image are projected by the first and second projection devices alternately. It will be understood that the successive pixels of the complete image are projected by the first and second projection devices either, alternately, consecutively or progressively. The successive pixels of the complete image may be projected by the first and second projection devices such the pixels projected by each of the first and second projection devices are interlaced. The complete image therefore has twice the resolution of an image which could be projected by either one of the first or second projection devices alone. The complete image therefore has twice the resolution of an image which could be projected by either one of the first or second projection devices alone.

The method may further comprise detecting characteristics of the images projected by some or all of the two or more projection devices.

The method may further comprise the step of detecting the position on the display surface of the image projected by a projection device. Preferably, the method further comprises the step of detecting the position on the display surface of the image projected by each of the two or more projection devices. The two or more projection devices may be configured such that the image projected by each of the projection device are in co-operation on the display surface, based on the detected position of the images projected.

The method may further comprise detecting the size of the images projected by some or all of the two or more projection devices.

The method may further comprise detecting the shape of the image projected by some or all of the two or more projection devices.

The method may further comprise detecting the brightness of the images projected by some or all of the two or more projection devices.

The method may further comprise the step of off-setting a reflective surface of a projection device. The method may further comprise the step of off-setting one or more reflective surfaces of the two or more projection devices. Preferably, the method comprises the step of, applying a DC off-set to a reflective surface to off-set the reflective surface. Off-setting the reflective surface will adjust direction in which the projection device projects, accordingly off-setting the reflective surface can be used to move the position of the projected image such that the projected image co-operates with an image projected by one or more other projection devices.

The method may further comprise the step of modifying the speed at which a reflective surface of a projection device oscillates. The method may further comprise the step of modifying the speed at which one or more reflective surfaces of the two or more projection devices oscillate. The method may comprise modifying an actuation signal which is used to oscillate a reflective surface in a projection device. For example, the amplitude of actuation signals used to oscillate reflective surfaces in each of the two or more projection devices may be increased or decreased. Increasing the amplitude of the actuation signal will increase the amplitude of oscillation of the reflective surface; accordingly the light projected from the projection devices will be projected over a wider span of the display surface, thereby increasing the size of the images projected by the projection device. Optionally, the modulation of the laser source may also be modified to decrease the speed at which the light pulses are generated by the laser source when the amplitude of oscillation of the reflective surface is increased; this will ensure that gaps to not appear between successive pixels on the display surface. Decreasing the amplitude of the actuation signal may decrease the amplitude of oscillations of the reflective surface; accordingly the light projected from the projection device will be projected over a shorter span of the display surface, thereby decreasing the size of the image projected. Optionally, the modulation of the laser source may also be modified to increase the speed at which the light pulses are generated by the laser source when the amplitude of oscillation of the reflective surface is decreased; this will ensure that the pixels belonging to a particular row do not appear on another row, thereby not distorting the image.

The method may further comprise the step of, modifying the modulation of a light source in a projection device. Modifying the modulation of a light source in a projection device can alter the size of the image projected on the display surface. For example, modifying the modulation of a light source in a projection device can crop the image projected on the display surface, thereby decreasing the size of the image visible on the display surface. For example, the light source in a projection device may be a laser source; light pulses may be generated by the laser source, each light pulse corresponding to a pixel of the image to be projected onto a display surface. The light from the laser source may be scanned across the display surface by a micro-mirror within the projection device. For example, the micro-mirror may oscillate about a two orthogonal oscillation axes to scan the laser light in a zig-zag, lissajou, or raster pattern along the display surface, so that the image is projected, pixel-by-pixel, onto the display surface. If the modulation of the laser source is now modified to increase the speed at which the light pulses are generated then, assuming the speed of oscillation of the micro-mirror remains the same, the space between consecutive pixels on the display surface will be reduced. Accordingly, a smaller image will be visible on the display surface. Furthermore, increasing the speed of the light pulses generated by the laser source will ensure that each row of pixels of the image will be projected prior to the micro-mirror completing full oscillations. Accordingly, the image is cropped or shrinked and a smaller image will be visible on the display surface.

The reflective surface may be a mirror. For example, the reflective surface may be a MEMS micro mirror. The reflective surface may be a DLP, LCOS, LCD, TFT and or OLED.

The method may further comprise the step of adjusting the brightness of the light projected by one or more of the projection devices. Preferably, the brightness of the light projected by one or more of the projection devices is adjusted so that the brightness of the light projected by each projection device is uniform. The brightness of the light projected by one or more of the projection devices may be adjusted so that the brightness of the light projected by each projection device is non uniform.

The image projected by each of the projection devices may be a test image which is used to determine how the two or more projection devices should be configured such that the image projected by each of the projection device are in co-operation on the display surface.

According to a further aspect of the present invention there is provided a method of projecting a 3-D image comprising the steps of:

d. Providing two or more projection devices;

e. arranging the two or more projection devices into a first group and second group, wherein the first group and second group each comprise one or more projection devices;

f. arranging the first and second group of projection devices such that each group of projection devices can project an image on a display surface, wherein the first group of projection devices is arranged such that the first group of projection devices can project an image to a first position on the display surface and the second group of projection devices is arranged such that the second group of projection devices can project an image to a second position on the display surface, wherein the first and second positions off-set from one another;

g. configuring the first and second group of projection devices such that the first and second group of projection devices alternately project onto the display surface.

Preferably, the first and second positions are off-set from one another by an amount required to form 3-D image on the display surface. Preferably, the off-set is substantially equal to the average distance between a human's left eye and a humans right eye. Preferably, the off-set is between 0 cm-11 cm. More preferably, the off-set is between 0.1 cm-3 cm.

According to a further aspect of the present invention there is provided a projection device, which is configured to project an image which is co-operable with images projected by one or more other projection devices, wherein the projection device comprises, h. a detector operable to detect characteristics of images projected by the projection device and the one or more other projection devices and i. a controller operable to adjust the projection device and/or the one or more other projection devices, based on the characteristics of the images detected by the detector, such that the images projected by each projection device co-operate on a display surface.

The controller may be operable to adjust a reflective surface within projection device and/or to adjust a reflective surfaces within the one or more other projection devices, based on the characteristics of the images detected by the detector, such that the images projected by each projection device co-operate on the display surface.

According to a further aspect of the present invention there is provided a projector arrangement comprising a plurality of projection devices according to the previous paragraph.

The detector may be configured to detect at least one of the characteristics of the images selected from the group of comprising; the position of the image on the display surface; the size of the image on the display surface; the shape of the image on the display surface the brightness of the image.

The detector may comprise one or more CCD camera or/and one or more CMOS camera or/and one or more photodiodes.

The detector may comprise a means for one or more of the following: self mixing; image projection analysis using a camera to analyze an image; time of flight measurement by measuring the time of flight of a signal which defines a pixel, or signals which define a group of pixels, in a projected image (the time of flight of the signals can be measured simultaneously with the projected pixel or successively); measuring time of flight of a signal which defines a pixel, or signals which define a group of pixels, in a projected image, using a single photodiode; carrying out triangulation using two or more cameras; projecting a patterned test image and measuring deformation of the patterned image; carrying out acoustic analysis using an acoustic sensor.

The controller may be operable to adjust a projection device, based on the characteristics of the images detected by the detector, to change the size, shape, position, and/or brightness of the image projected by the projection device. The controller may be operable to adjust another projection device, based on the characteristics of the images detected by the detector, to change the size, position, shape and/or brightness of the image projected by the projection device.

The controller may be configured to change the image projected by the projection device. The controller may be configured to change the image projected by another projection device. For example, the controller may change the colour of an image so as to compensate for the colour of the display surface.

The controller may operate automatically without requiring user input to adjust the projection device.

The controller may be operable to adjust the projection devices such that the images projected by the projection devices co-operate by overlapping. The controller may be operable to adjust the projection devices such that the images projected by each projection devices co-operate by aligning. The controller may be operable to adjust the projection devices such that the images projected by each projection devices co-operate by overlapping and aligning. For example; if the user desires a specific image size or image resolution that cannot be achieved by means of overlapping or aligning only, in this case the controller may adjust the projection device and the one or more other projection devices, to achieve the desired image size or resolution, by overlapping and aligning the projected images.

Preferably, the controller is operable to off-set a reflective surface of a projection device. For example, a first projection device may project a first image onto a display surface and second projection device may project the same image onto a different position on display surface. Each of the first and second projection devices project images in the same manner: light pulses corresponding to an image pixel, are generated in a light source of the each projection device; a reflective surface in each projection device, in the form of a MEMS micro mirror, is oscillated about two orthogonal oscillation axis by means of an alternative (AC) actuation signal (e.g., an AC voltage) which is applied to the actuator(s) (e.g., piezoelectric, electrostatic, thermal and/or magnetic actuators) which co-operate with the MEMS micro mirrors, to scan the light pulses in a zig-zag, lissajou or raster pattern across the display surface to display the image on the display surface pixel-by-pixel. The first projection device is a projection device according to the present invention. The detector of the first projection device detects the position on the display surface of the images projected by the first and second projection devices. Subsequently, the controller adjusts the AC actuation signals which are applied to the actuators in the first projection device, by applying a DC off-set to the AC actuation signal, thereby causing the first projection device to project its image to a defined location on the display surface. The controller of the first projection device communicates wirelessly (or with wire) with the second projection device and sends a command to the second projection device to apply a DC off-set to its actuation signal, causing the second projection device to also project its image to the defined location on the display surface. Accordingly, the image projected by the first projection device and the image projected by the second projection device overlap on the display surface. Overlapping the images projected by the projections devices will provide for the projected image, visible on the display screen, with increased brightness. Alternatively, the controller can adjust each projection device such that the images projected by each projection device are in alignment on the display surface. Alternatively, it is also possible for each of the projections devices to comprise its own detector and a controller. The detector and controller of each projections device can co-operate with the detectors and controllers of the other mobile phones to achieve the desired co-operation of the images on the display surface. Alternatively, if each of the projections devices comprises a detector and controller, then the detector and controller of one of the projections devices may be designated as the "master" and the detectors and controllers of the other mobile phone designated as the "slaves". The master detector and controller may effect adjustment of the projection devices in the other mobile phones.

It will be understood that the light could be scanned by the MEMS micro mirrors reflective surface, in a bidirectionally, unidirectionally or progressively manner, or such that lines are interlaced.

The controller may be operable to adjust one or more projection devices such that the size or shape of the image projected by each projection device is altered. Preferably, the controller is operable to modifying the amplitude at which a reflective surface in each of the one or more projection devices, oscillate. For example, the detector can detect the size of the image projected by the two projection devices and subsequently the controller can adjust each projection device such that they each project the same size and shape of image, by for example, modifying the amplitude at which a reflective surface in each of the two projection devices, oscillate.

The controller may be operable to modifying the modulation of a light source in one or more projection devices.

The controller may be operable to adjust the brightness of the light projected by a projection device. The controller may be operable to adjust the brightness of the light projected by each of the projection devices. Preferably, the controller is operable to adjust the brightness of the light projected by the projection device and the one or more projection devices such that brightness of a complete image which is defined by image portions projected by the projection device and the one or more other projection device, is uniform.

The controller may be operable to calculate an optimum position on the display surface for projection of the image. Projecting the image at the optimum position will minimise the required overall adjustment of the projection devices in order to achieve the desired co-operation of the images on the display surface.

The projection device may comprise a means for detecting gestures made by a user. The projection device may comprise a means for detecting an object; for example the device may comprise a means for detecting a pointer which is positioned on an image. The projection device may comprise a means for providing the projected images with tactile functionality. The projection device may further comprise a means for detecting an interaction of a user with a projected image. For example the projection device may comprise a means for detecting touching of a projected image by a user.

The projection device may further comprise a means to detect characteristics of a display surface. The projection device may further comprise a means to adjust the projection device to compensate for irregularities detected on the display surface. For example, the display surface may be uneven, and the projection device may be adjusted to account for the uneven surface so that an undistorted image is visible to a viewer; or the display surface may not comprise a uniform colour, and the projection device may be adjusted to compensate for the colour difference across the display surface; thus ensuring that the colours of the projected image are not distorted by the colours of the display surface.

The projection device may further comprise a means for off-setting a reflective surface of a projection device. The projection device may further comprise a means for off-setting a reflective surface of two or more projection devices. The means for off-setting a reflective surface may comprise a means for applying a DC off-set to a reflective surface to off-set the reflective surface. Off-setting the reflective surface will adjust direction in which the projection device projects, accordingly off-setting the reflective surface can be used to move the position of the projected image such that the projected image co-operates with an image projected by one or more other projection devices.

The projection device may further comprise a means for off-setting a reflective surface of a projection device to avoid an obstacle positioned in a projection path of the projection device. The projection device may further comprise a means for off-setting a reflective surface of a projection device to avoid an area of the display surface which is not suitable for displaying a projected image. The projection device may further comprise a means for off-setting a reflective surface of a projection device to avoid an obstacle obstructing a display surface.

A reflective surface may be off-set using at least one of; applying a DC off-set signal to an actuation signal which actuates the oscillation of the reflective surface in a projection device; off-setting the position of a holder which holds a reflective surface in the projection device; off-setting a second reflective surface which cooperates with a reflective surface in a projection device.

The projection device may comprise a means for proposing to a user different positions on the display surface onto which to project. For example a projection system may project randomly to a plurality of different positions. The projection system may request the user to choose one of the plurality of positions onto which to project.

The projection device may be configured to project a test image which is used to determine how the two or more projection devices should be configured such that the image projected by each of the projection device are in co-operation on the display surface. The projection device may be configured to project a test image which is used to determine one or more characteristics of a display surface.

The projection device may comprise a means for selectively configuring projection device to project underexposed, overexposed, or correctly exposed image. The projection device may comprise a means for selectively configuring another projection device to project underexposed, overexposed, or correctly exposed image. The projection device may comprise a means to adjust the projection device such that a projection device projects one of either an overexposed image, underexposed image or correctly exposed image, and wherein the device is operable to adjust at least one other projection device such that the at least one other projection device projects one of an overexposed image, underexposed image or correctly exposed image, wherein the exposure of the image projected by the projection device is different to the exposure of the image projected by the at least one other projection device, wherein the projected images cooperate on the display surface to define a single image which has improved brightness and clarity. The projection device may comprise a means for configuring a first projection device to project an underexposed image, configuring a second projection device to projection an overexposed image, and a third projection device to project a correctly exposed image. The projection device may comprise a means for ensuring that each of the underexposed image, overexposed image, correctly exposed image, are projected to the same position on a display surface, where the images can cooperate. The images may cooperate to provide a high dynamic range image. It will be understood that the images may be frames of a video. The controller may be configured to adjust the projection device and other projections devices.

The projection device may comprise a means for dimming the brightness of an image projected by the projection device. The projection device may comprise a means for dimming the brightness of an image projected by one or more another projection device. The projection device may comprise a means for adjusting at least one of the following parameters of an image projected by the projection device; contrast, tone, colour gamut, saturation, colour balance, brightness, adaptive image ISO. The projection device may comprise a means for adjusting at least one of the following parameters of an image projected by one or more projection device; contrast, tone, colour gamut, colour balance, brightness, adaptive image ISO. This may enable the projected image to be provided with increased perceived brightness and/or readability.

The projection device may comprise a filter for filtering a projected image. The projection device may comprise a means for filtering at an image projected by the projection device. The projection device may comprise a means for filtering at an image projected by another projection device. The filter or means for filtering may be configured to filter colour, attenuation, blur, sharpener, artistic, brush strokes, sketch, stretch, render, stylize, distortion, pixelization, shadow, digitization, edge sharpen, equalizer, night vision, panorama, red eye eraser, texture, noise in a projected image. These parameters can be applied either in fixed range or in dynamic range.

The projection device may comprise a first mirror which is configured such that it can oscillate along an oscillation axis to scan light on the display surface; and a second mirror which is configured such that it can oscillate along an oscillation axis to scan light on the display surface, wherein the first and second mirrors are in optical communication; wherein the first mirror is configured to oscillate faster than the second mirror; and wherein the device further comprises a means to adjust the projection device such that the second mirror can scan light in the horizontal direction and the first mirror can scan light in the vertical direction.

The projection device may further comprise a means to adjust the projection device and one or more of the other projection devices such that the images projected by the projection device and the one or more other projection devices overlap on the display screen. Preferably the images will directly overlap one another; i.e., will have the same size and be projected to the same position on the display screen.

Preferably, the first mirror which is configured such that it can oscillate along an oscillation axis to scan light in a horizontal direction and a second mirror which is configured such that it can oscillate along an second oscillation axis to scan light in a vertical direction, before the projection device is adjusted. The first and second oscillation axis may be orthogonal.

Adjusting the projection device such that the scanning of the first and second mirrors is inverted so that the fast oscillating mirror scans light vertically and the slow oscillating mirror scans light horizontally, and overlapping the projected image with images (which have the same image content) projected by one or more other projection systems which have a typical fast oscillating mirror which scans light horizontally and a slow oscillating mirror which scan light vertically, will result in a projected image which has increased pixel density and provide for a more readable projected image.

The means to adjust the projection device may comprise a means to invert the oscillation axis of the first and second mirrors.

The means to adjust the projection device may comprise a means to tilt the projection device. Preferably, the means to tilt the projection device will be operable to tilt the projection device by at least 90.degree.

According to a further aspect of the present invention there is provided a projection device, which is configured to project an image which is co-operable with images projected by one or more other projection devices, wherein the projection device comprises j. a receiver, configured to receive commands from a controller of another projection device.

Preferably, the receiver is configured to receive commands from a controller of a projection device according to any of the above-mentioned projection devices.

The projection device may comprise a controller configured to execute the commands received.

According to a further aspect of the present invention there is provided a mobile device comprising any of the above-mentioned projection devices.

The mobile device may be at least one selected from the group comprising, a mobile phone, digital camera, laptop computer, tablet, smart-phone, or any other consumer mobile device.

BRIEF DESCRIPTION OF THE DRAWINGS

An embodiment of the invention will now be described by way of example only, with reference to the accompanying drawings in which, FIG. 1 provides a perspective view of four mobile phones, each of which comprises a projection device according to the present invention, wherein the projection device of each mobile phone is arranged to project an image onto a display surface.

DETAILED DESCRIPTION OF THE PRESENTLY PREFERRED EMBODIMENTS

Figure 1:
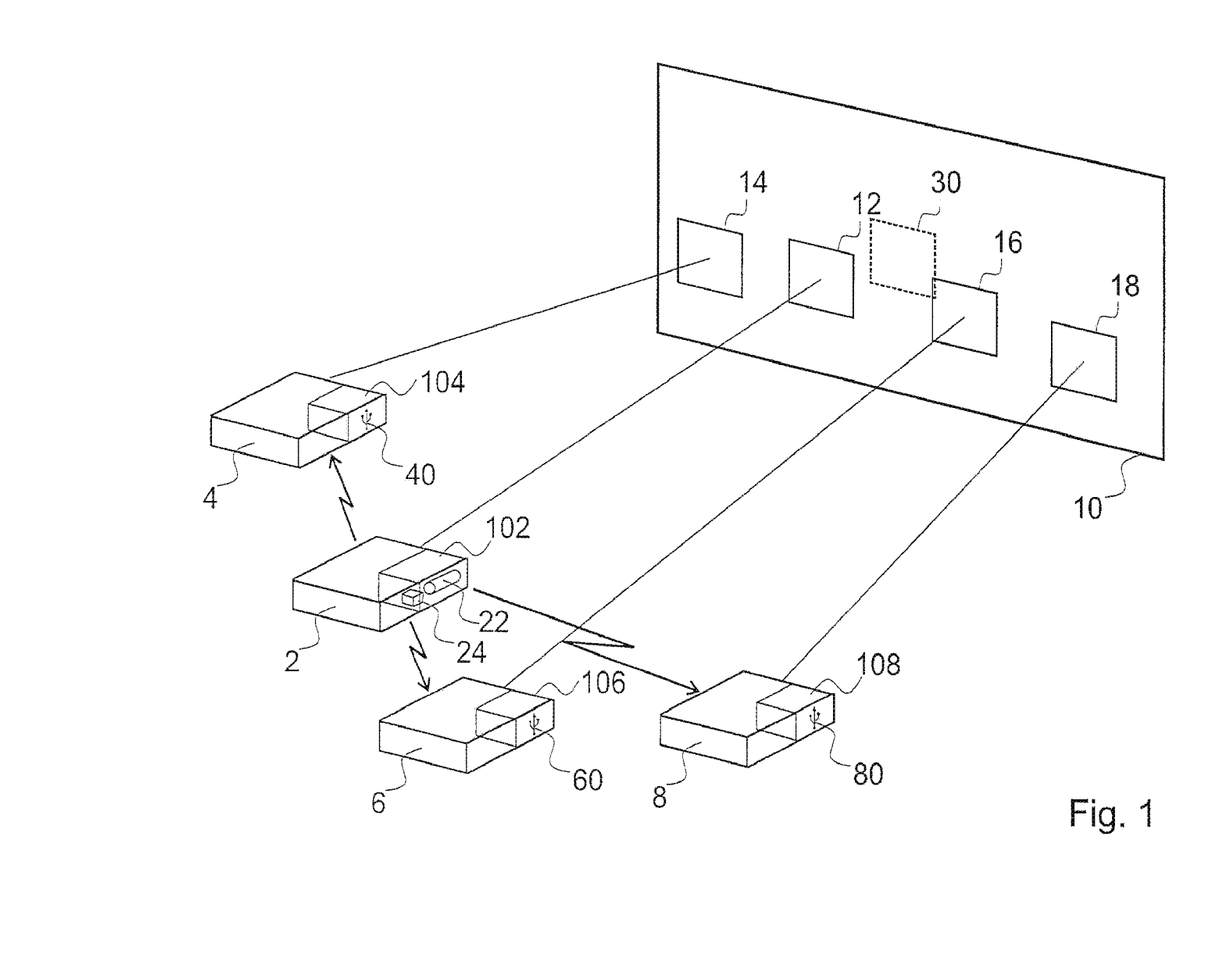

FIG. 1 provides a perspective view of four mobile phones 2,4,6,8. Each of the mobile phones 2,4,6,8 comprises a projection device 102,104,106, 108 which projects an image 12,14,16,18 onto a display surface 10. The four mobile phones 2,4,6,8 each have a different orientation, accordingly, the positions of their respective projected images 12,14,16,18 on the display surface 10 is different.

Figure 1A:
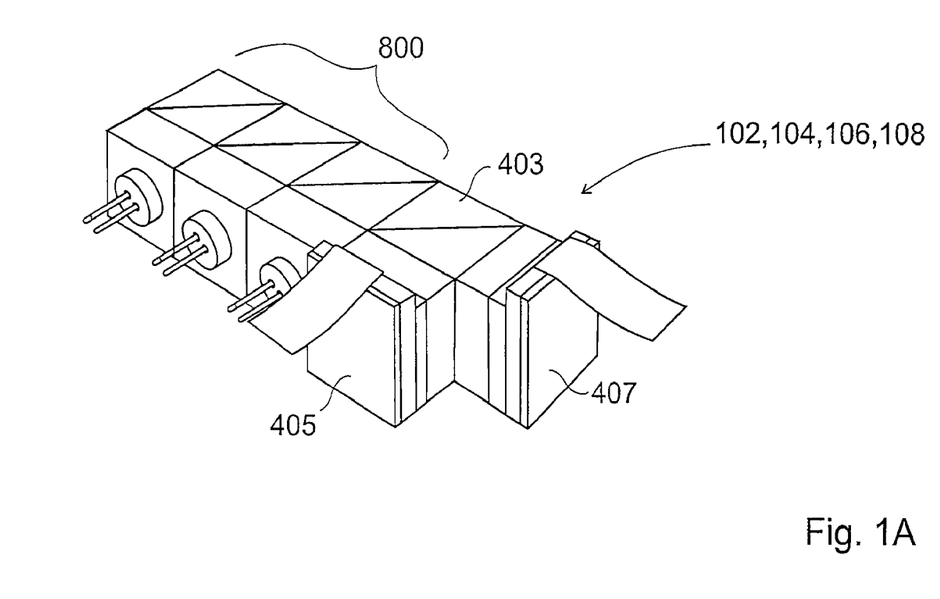
FIG. 1a provides a perspective view of a projection device which each of the mobile phones shown in FIG. 1 comprise.

FIG. 1a provides a perspective view of the projection device 102,104,106, 108 which each mobile phone 2,4,6,8 comprises. As shown in the figure the projection device 102,104,106, 108 comprises a beam combiner 800, a beam splitter 403 and two packages 405,407 each of which houses a micro mirror (not shown) which can deflect light from the beam splitter to the display screen (not shown).

Figure 2:
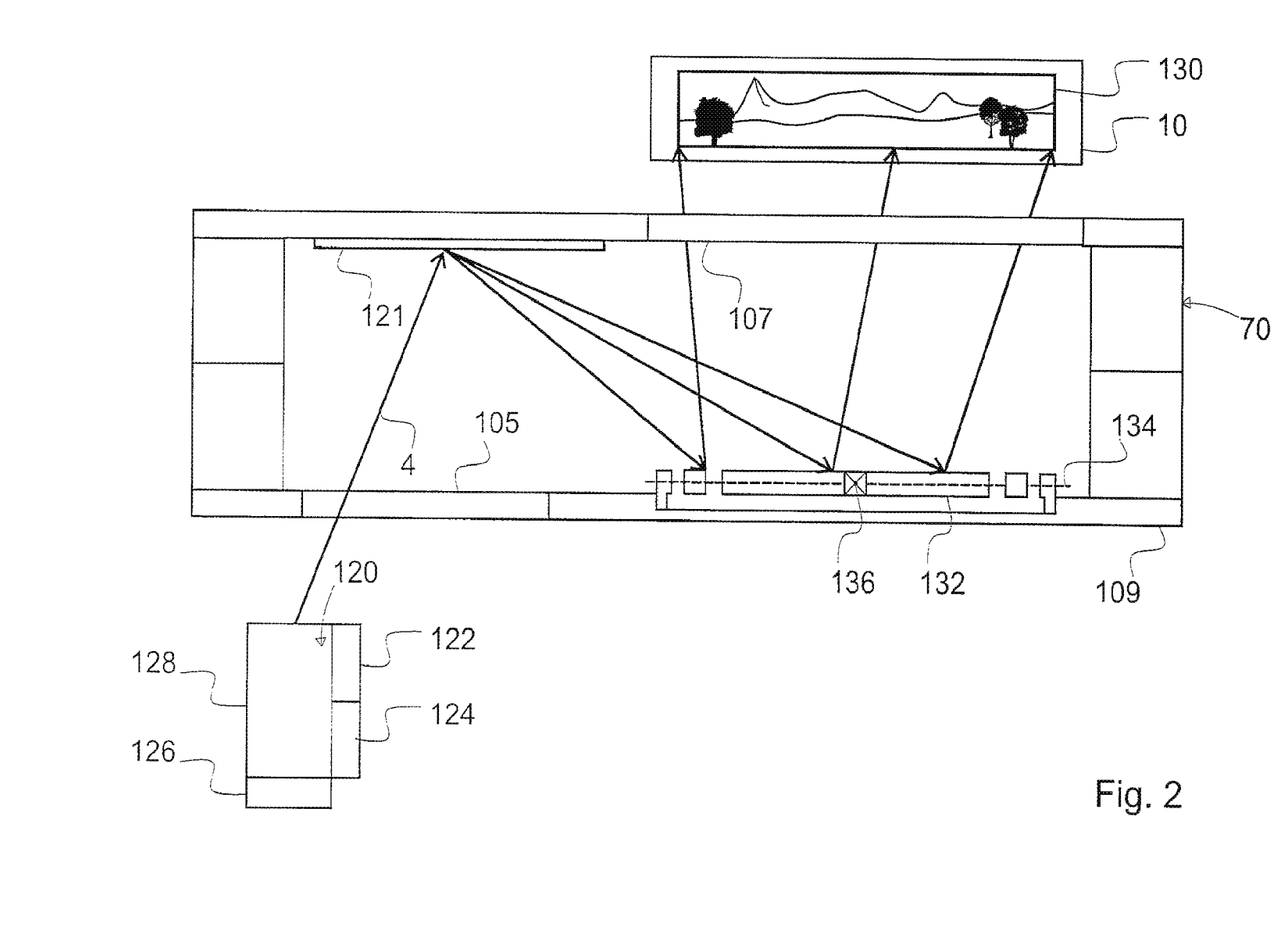
FIG. 2 illustrates the features which are common to the projection devices of each of the mobile phones shown in FIG. 1.

FIG. 2 illustrates one possible configuration for the features which are common to each projection device 102,104, 106, 108 of each mobile phone 2,4,6,8. Each projection device comprises alight source 120 which comprises a red 122, green 124 and blue 126 lasers, each of which provides light which is combined in a beam combiner 128 to generate light pulses 4. Each light pulse 4 corresponds to a pixel of an image 130 (or video) to be projected onto the display surface 10. Each projection device 102,104,106, 108 comprises a housing 70 which comprises a fixed reflective element 121 and a MEMS micro mirror 132 supported therein. The MEMS micro mirror 132 is configured to oscillate about two orthogonal oscillation axes 134,136.

During operation light pulses 4 passes from the beam combiner 128 to the fixed reflective element 121 via a transparent window in the housing 70. The light pulses 4 are deflected by the fixed reflective element 121 to the MEMS micro-mirror 132. The MEMS micro-mirror 132 deflects the light pulses 4 to the display surface 10, via a second transparent window 107 in the housing 70, allowing the reproduction of the image 130 (or video) on the display surface 10. As the MEMS micro-mirror 132 deflects the light pulses 4 to the display surface 10 it oscillates to about its two orthogonal oscillation axes 134,136. By oscillating, the micro-mirror 132 within the projection devices 102,104,106, 108 will continuously scan the light pulses in a zig-zag pattern over the display surface 10 so that the 2-D image is displayed on the display surface 10, pixel-by-pixel.

The MEMS micro-mirror 132 is actuated to oscillate about its two orthogonal oscillation axes 134,136 by an AC voltage actuation signal which is applied to piezoelectric actuators (not shown) which cooperate with the MEMS micro mirror 132 to oscillate it about its two orthogonal oscillation axes 134,136.

Figure 3:
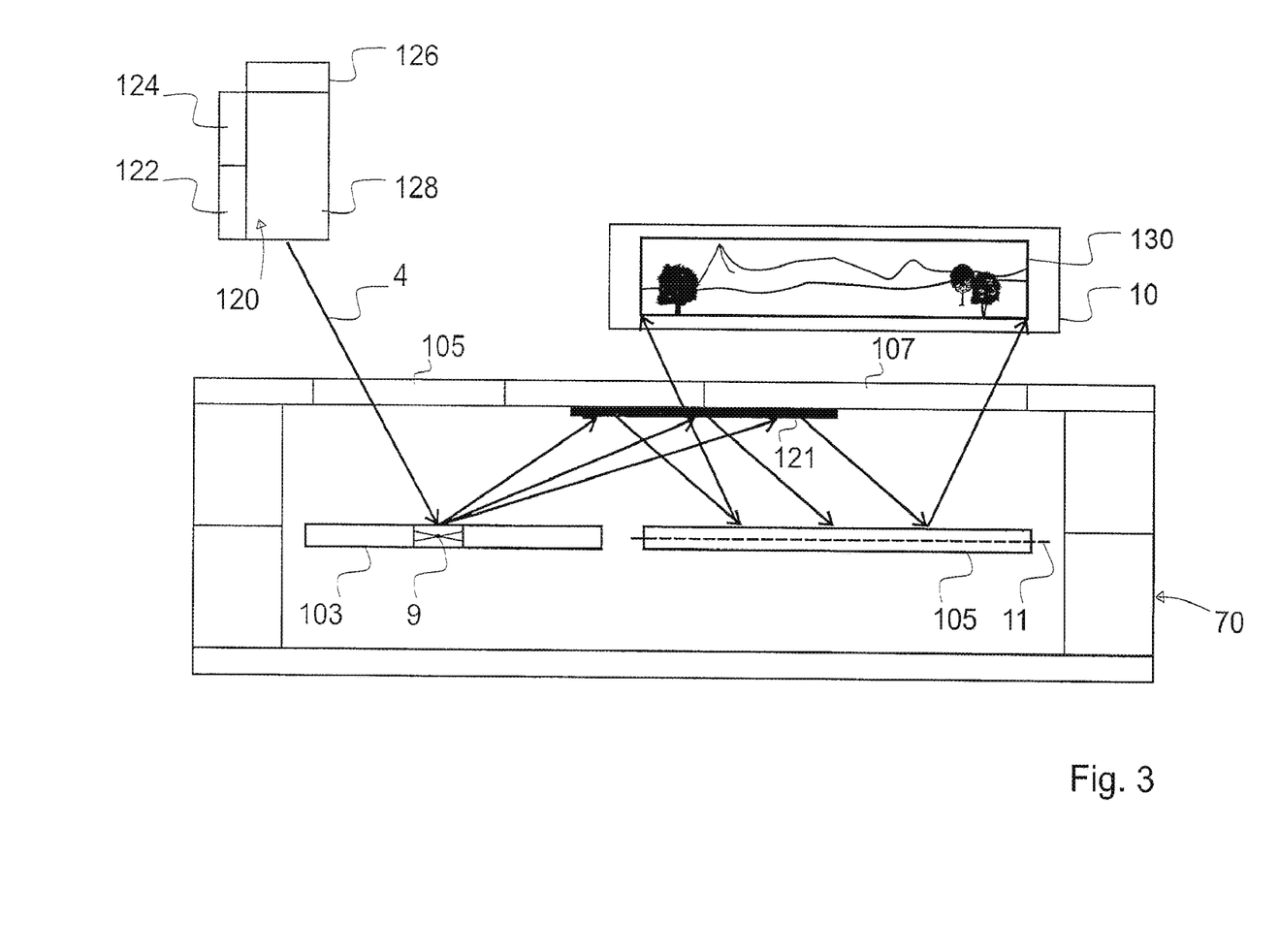
FIG. 3 illustrates a alternative configuration for the projection devices of the mobile phones shown in FIG. 1.

An alternative to the configuration illustrated in FIG. 2, each projection device 102,104,106,108 may be configured as illustrated in FIG. 3. In the configuration shown in FIG. 3, instead of having one micro-mirror which oscillates about two orthogonal axis, two MEMS micro mirrors 103,105 are provided, each MEMS micro mirror 103,105 is arranged to oscillate about a single oscillation axis 9,11 and wherein the axes of oscillation 9,11 of the MEMS micro mirrors 103,105 are perpendicular. The projection device 102,104,106,108 operates in a similar fashion to the projection device illustrated in FIG. 2, except that the first MEMS micro-mirror 103 oscillates about oscillation axis 9 to cause the light pulses 4 to be deflected along the horizontal and a second MEMS micro-mirror 105 oscillates about oscillation axis 11 to cause the light pulses 4 to be deflected along the vertical. The combined effect of the two oscillating MEMS micro-mirrors 103,105 is to scan the light pulses 4 in a zig-zag pattern over the display surface 10 so that the 2-D image 130 is displayed on the display surface 10, pixel-by-pixel. As was the case for the configuration shown in FIG. 2, each MEMS micro-mirror 103,105 is actuated by an AC voltage actuation signal which is applied to piezoelectric actuators (not shown) which co-operate with each of the MEMS micro mirrors 103,105 to oscillate them about their respective oscillation axis 9,11.

In the present example, the projection devices 102,104, 106, 108 of each of the mobile phones 2,4,6,8, shown in FIG. 1 each comprise a MEMS micro-mirror which is configured to oscillate about two orthogonal oscillation axes (i.e., each projection device has the configuration shown in FIG. 2). Accordingly, each of the projection devices 102, 104,106,108 project their images 12,14,16,18 in the same manner: light pulses 4 corresponding to image pixels, are generated in a light source 120 of the projection device; a MEMS micro mirror 132, in each projection device 102, 104,106,108, is oscillated about its two orthogonal oscillation axes 134,136 by means of an actuation signal (usually an AC voltage or an AC current) applied to piezoelectric actuators (not shown) which co-operate with the MEMS micro mirror 132, to scan the light pulses 4 in a zig-zag, lissajou or raster pattern across the display surface 10 to display the image 130 on the display surface.

Referring once again to FIG. 1; the projection device 102, contained in mobile phone 2, further comprises a detector 22 and a controller 24. The detector 22 is operable to detect characteristics of the images 12,14,16,18 projected by the projection devices 102,104,106,108 of each mobile phone 2, 4,6, 8. In the present embodiment the detector 22 is operable to detect, the position of each image 12,14,16,18 on the display surface 10, the brightness of each image 12,14,16, 18, the shape of each image 12, 14, 16, 18 and the dimensions of each image 12,14,16,18. It will be understood that the detector 22 could be configured to detect other characteristics of each image 12, 14, 16, 18 in addition to image's position, brightness, shape and dimensions. In the present embodiment the detector 22 is a CCD or CMOS camera or a photodiode, however it will be understood that the detector 22 may take any other suitable form.

The controller 24 is operable to adjust the projection device 102, and the projection devices 104,106,108 in the other mobile phones 4,6,8, based on the characteristics of the images 12,14,16,18 detected by the detector 22. The controller 24 is in wireless communication (as illustrated by zig-zag arrows) with the projections devices 104,106,108 of the other mobile phones 4,6,8, via a wireless communication means (not shown). In order to adjust the projection devices 104,106,108 of the other mobile phones 4,6,8, the controller 24 sends adjustment commands to the projection devices 104,106,108 of the other mobile phones 4,6,8, via the wireless communication means. The projection devices 104, 106, 108 in each of the other mobile phones 4,6,8, comprise a receiver 40,60,80 which receives adjustment commands sent by the controller 24. It is also possible for projection device 102,104,106,108 of each of the mobile phones 2,4, 6,8 to comprise its own detector 22 and a controller 24. The detector 22 and controller 24 of each mobile phone can co-operate with the detectors 22 and controllers 24 of the other mobile phones to achieve the desired co-operation of the images on the display surface. Alternatively, if each of the projection device 102,104,106,108 of each of the mobile phones 2,4,6,8 comprises a detector 22 and controller 24, then the detector 22 and controller 24 of one of the mobile phones 2,4,6,8 may be designated as the "master" and the detectors 22 and controllers 24 of the other mobile phone designated as the "slaves". The "master" detector 22 and controller 24 may effect adjustment of the projection devices 102, 104, 106, 108 in the other mobile phones 2,4,6,8.

The brightness of each of the images 12,14,16,18 visible on the display surface 10 is limited by the maximum brightness of the light which can be provided by the light source 120 in each projection device 102,104,106,108. Overlapping the images 12,14,16,18 projected by each projection device 102,104,106,108 on the display surface 10 will display a single, brighter image, on the display surface 10.

To achieve overlapping of the images 12,14,16,18 on the display surface 10 a user may simply orientate the mobile phones 2,4,6,8 so that their respective projection devices 102,104,106,108 each project to the same position on the display surface 10. Accordingly, if the projection device 102,104,106,108 of each mobile phone 2,4,6,8 projects the same image 12,14,16,18 the images will overlap so that a single image is visible on the screen. As the single image is formed by the light projected by all four of the projection devices 102,104,106,108 the displayed single image will appear brighter on the display surface 10.

Alternatively, to achieve overlapping of the images 12,14, 16,18, the detector 22 in projection device 102 detects the position of each of the images 12,14,16,18 on the display surface 10. The detector 22 also detects the brightness of each image, the shape of each image and the dimensions of each image 12,14,16,18. The detector 22 passes image position information, image size information, image shape information and image brightness information, for each of the images 12,14,16,18, to the controller 24.

Based on the image position information provided by the detector 22, the controller 24 calculates an optimum position on the display surface 10 at which the images 12,14,16,18, should be overlapped. The optimum position is the position on the display surface 10 which is closest to each of the projected images (i.e., the average position); therefore, overlapping the images 12,14,16,18 at the optimum position which will ensure minimal overall adjustment of the projection devices 102,104,106,108 is required in order to achieve the desired overlapping of images 12,14,16,18 on the display surface 10. In the present example the controller 24 has calculated that the optimum position on the display surface 10 for overlapping of images 12,14,16,18 is position 30. Accordingly, the controller 24 will adjust each of the projection devices 102,104,106,108 such that they each project their respective images 12,14,16,18 to position 30 on the display surface 10.

To adjust the projection device 102 such that it projects its image 12 to position 30 on the display surface, the controller 24 adjusts the AC actuation signal, which is applied to piezoelectric actuators (not shown) (it will be understood that other types of actuators could also be used) that oscillate the MEMS micro-mirror 132 within the projection device 102 about the two oscillation axes 134,136, to include a DC off-set. It will be understood that the actuators may take any suitable form and are not limited to piezoelectric actuators; for example the actuators may be magnetic, electrostatic, thermal, or electro-magnetic. The application of a DC off-set to the AC actuation signal causes off-setting of the position of the MEMS micro mirror 132 so that the image 12 is projected to position 30 on the display surface 10. Comparing the current position of the image 12 with the optimum position 30, the controller 24 calculates the amplitude of DC off-set to be applied to the AC actuation signal.

To adjust the other projection devices 104,106,108 such that they each project their respective images 14,16,18 to position 30 on the display surface 10, the controller 24 sends an adjustment command, via the wireless communication means, to each of the other projection devices 104,106,108. The adjustment commands are received by the receivers 40, 60, 80 of each projection device 104,106,108. Each adjustment command, when executed within the projection device 104,106,108, will effect adjustment of the AC actuation signal, which is applied to piezoelectric actuators (not shown) to oscillate the respective MEMS micro-mirrors 132 within each projection device 104,106,108 about the two oscillation axes 134,136, to include a DC off-set. In each projection device 104,106,108 the application of a DC off-set to the AC actuation signal causes off-setting of the position of the MEMS micro mirror 132 within that projection device 104,106,108 so that the projection device 104, 106,108 projects its image 14,16,18 to position 30 on the display surface 10. For each projection device 104,106,108 the required amplitude of DC off-set to be applied to the AC actuation signal is calculated by the controller 24 by comparing the current position of the image 14,16,18 projected by that projection device 104,106,108, with the optimum position 30. As each mobile phone 2,4,6,8 has a different orientation, the MEMS micro mirror 132 of each projection device 104,106,108 will require a different adjustment, consequently the amplitude of DC off-set to be applied to the AC actuation signal in each projection device 104,106,108 will be different for each projection device 104,106,108.

Once the required DC off-set has been applied to the AC actuation signal in each projection device 102,104,106,108, the projection device 102,104,106,108 of each mobile phone 2,4,6,8 will project their respective images 12,14,16,18 to the same position on the display surface (i.e., to optimum position 30) so that the images 12,14,16,18 overlap at optimum position 30.

To display a single image of increased brightness the overlapping images 12,14,16,18 should each be the same size. To adjust the size of the image 12,14,16,18 projected by a projection device 102,104,106,108, the controller 24 adjusts the amplitude of the AC actuation signal which is applied to piezoelectric actuators to oscillate the MEMS micro-mirrors 132 within each projection device 102,104, 106,108. Based on the image size information provided by the detector 22 the controller 24 calculates an optimum image size. The optimum image size will be the average size of each of the four projected images 12,14,16,18, thus will be the image size which can most efficiently be achieved as it will required the least overall adjustment of the projection devices 102,104,106,108. For each projection device 102, 104,106,108, using the image size information provided by the detector 22, the controller 24 determines whether that projection device 102,104,106,108 should be adjusted to increase the size of the image 12,14,16,18, or adjusted to decrease the size of the image 12,14,16,18, to achieve the optimum image size.

To increase the size of an image 12,14,16,18 the controller 24 increases the amplitude of the AC actuation signal, which is applied to piezoelectric actuators to oscillate the MEMS micro-mirror 132 within that projection device 102,104,106, 108. Increasing the amplitude of the actuation signal increases the amplitude of oscillations of the MEMS micro-mirror 132 about at least one of its oscillation axes 134,136 (e.g. the oscillation axis about which the MEMS micro mirror 132 oscillates to scan light along the horizontal axis). Increasing the amplitude of the oscillations of the MEMS micro-mirror 132 about at least one of its oscillation axes 134,136 will ensure light is scanned across a larger area of the display surface 10, thus the image 12,14,16,18 will be projected over a larger area of the display surface 10 to provide a larger image. Conversely, to decrease the size of an image 12,14,16,18 the controller 24 decreases the amplitude of the AC actuation signal which is applied to piezoelectric actuators to oscillate the MEMS micro-mirror 132 within that projection device 102,104,106, 108. Decreasing the amplitude of the AC actuation signal decreases the amplitude of oscillation of the MEMS micro-mirror 132 about at least one of its oscillation axes 134,136 (e.g., the oscillation axis about which the MEMS micro mirror 132 oscillates to scan light along the horizontal axis). Decreasing the amplitude of oscillations of the MEMS micro-mirror 132 about at least one of its oscillation axes 134,136 will ensure light is scanned across a smaller area of the display surface 10, thus the image 12,14,16,18 will be projected over a smaller area of the display surface 10 to provide a smaller image.

Based on the size information for the images 12,14,16,18 provided by the detector 22, the controller 24 calculates the size adjustment required for each image 12,14,16,18 so that each image has a size equal to the optimum image size. In the present example the optimum image size is illustrated as a dashed line at position 30 of the display surface 10. To achieve the optimum image size the image 12 projected by projection device 102 should be reduced in size and images 14,16, and 18 projected by projection devices 104,106,108 should each be increased in size. Based on the size information for the images 12,14,16,18 provided by the detector 22, the controller 24 calculates the reduction in image size required for image 12 and equates this reduction in image size to a required reduction in amplitude for the AC actuation signal used to oscillate the MEMS micro-mirror 132. The controller 24 subsequently reduces the amplitude of the AC actuation signal in projection device 102 accordingly. Based on the size information provided by the detector 22, the controller 24 also calculates the increase in image size required for each of images 14,16,18 and equates each increase in image size to a required increase in amplitude for the AC actuation signals used in each projection device 104,106,108 to oscillate the MEMS micro-mirror 132. The controller 24 subsequently sends adjustment commands to each of projection devices 104,106,108 which affect the required increase in the amplitudes of the AC actuation signals when executed within the respective projection device 104,106,108. Once the amplitudes of the MEMS mirror actuation signals in each projection device 102,104, 106,108 have been adjusted by the controller 24, the same sized image 12,14,16,18 will be projected by each of the projection devices 102,104,106,108 at optimum position 30 on the display surface 10.

Additionally, or alternatively, the size of the image 12,14, 16,18 projected by a projection device 102,104,106,108 may be adjusted by changing the modulation of the light source 120 in the projection device 102,104,106,108. The controller 24 may increase the rate at which light pulses are generated by the light source 120 within a projection device 102,104, 106,108 to decrease the size of the image 12,14,16,18 projected by that projection device 102,104,106,108. An increase in the rate at which light pulses 4 are generated causes successive light pulses 4 to reach the MEMS micro mirror 132 of a projection device 102,104,106,108 at a faster rate which in turn means that successive light pulses 4 are projected to the display surface 10 at a faster rate. Since each light pulse 4 corresponds to a pixel of the projected image 12,14,16,18, the pixels will be closer together on the display surface 10 as the time between consecutive light pulses 4 is less and the speed of oscillation of the MEMS micro mirror has remained unchanged. Accordingly, a smaller image 12,14,16,18 will be visible on the display surface 10. Furthermore, given that the light pulses 4 are generated at a higher rate the light pulses 4 corresponding to each a row of pixels are projected onto the display surface 10 before the MEMS micro mirror 132 has completed an oscillation. Accordingly, the row of pixels will be displayed over a smaller span of the display surface 10. The same will be true for each row of pixels. Accordingly, the image 12,14,16,18 will be displayed over a smaller area of the display surface 10.

Optionally, the speed of oscillation of the MEMS micro mirror 132 within each projection device 102,104,106,108 may also be adjusted to compensate for the effects of laser modulation. For example, the speed of oscillation of the MEMS micro mirror 132 may be increased to ensure that the distance between successive pixels is not reduced by an increase in the rate at which the light source 120 generates light pulses 4.

It will be understood that each projection device 102,104, 106,108 could be simultaneously adjusted by the controller 24 for image size and image position.

Figure 4:
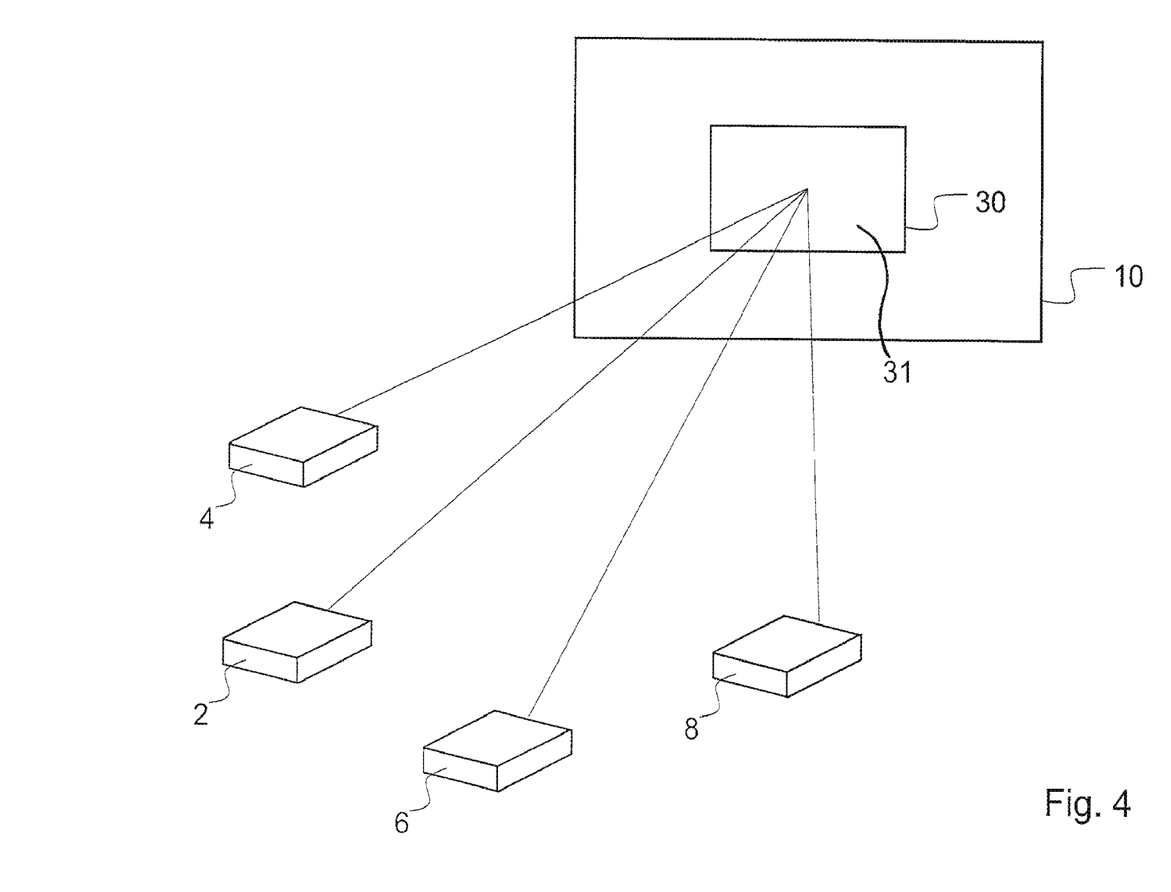
FIG. 4 provides a perspective view of the four mobile phones shown in FIG. 1 after a method according to one embodiment of the present invention has been implemented.

FIG. 4 provides a perspective view of the mobile phones after each projection device 102, 104,106,108 of each mobile phone 2,4,6,8 has been adjusted to project an image of the same size (optimum size) to the optimum position 30. Each of the projection devices 102, 104, 106, 108 projects the same image onto the display surface 10. Accordingly, as shown in FIG. 4, the image projected by each projection device overlaps on the display surface to display a single image 31 at position 30. The single image 31 has an overall brightness which is greater than the brightness of an image which could be projected by any of the projection devices 102, 104,106,108 alone. The overlapping of the images on the display surface 10 allows the light projected by each projection device 102, 104, 106, 108 to be combined on the display surface 10, to form a brighter image 31.

Figure 5:
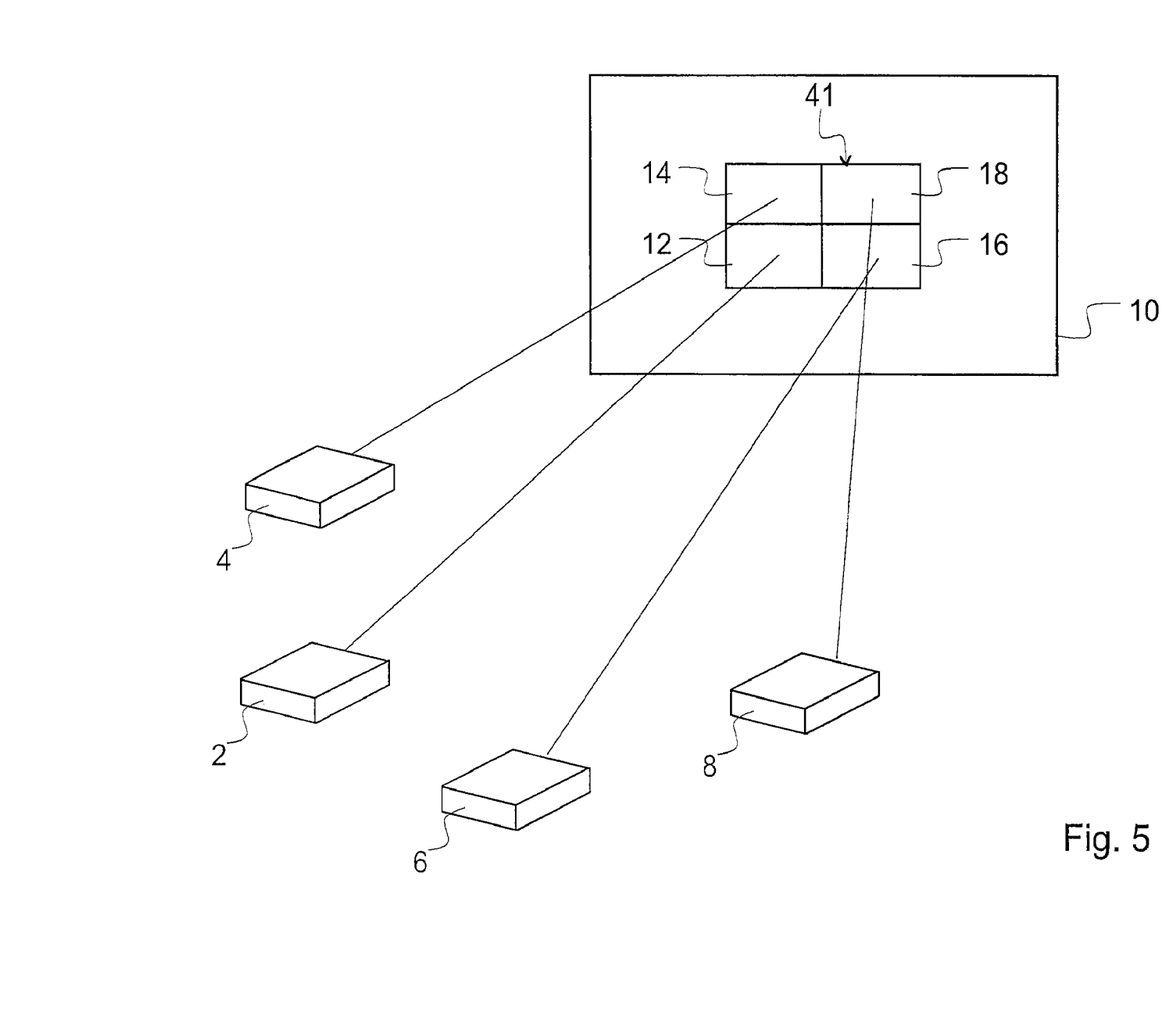
FIG. 5 provides a perspective view of the four mobile phones shown in FIG. 1 after a method according to further embodiment of the present invention has been implemented.

Instead of adjusting each projection device 102, 104,106, 108 so that the projected images overlap on the display surface 10, the controller 24 may alternatively adjust each projection devices 102, 104,106,108 so that the projected images are in alignment on the display surface 10. As illustrated in FIG. 5, the images 12,14,16,18 projected by each projection device 102, 104,106,108 align on the display surface 10 to form a single, larger complete image 41. The images 12,14,16,18 projected by each projection device 102, 104,106,108 each form a different part of the complete image 41; image 12 projected by projection device 102 forms the bottom left quarter of the complete image 41, image 14 projected by projection device 104 forms the top left quarter of the complete image 41, image 16 projected by projection device 106 forms the bottom right quarter of the complete image 41, image 18 projected by projection device 108 forms the top right quarter of the complete image 41. The images 12,14,16,18 combine, similar to pieces of a jig-saw, to display a single complete image 41 on the display surface 10. The resulting image displayed on the display surface 10 is larger than an image (of the same brightness) which could be projected by any of the projection devices 102, 104,106,108 alone.

The controller 24 adjusts each projection device 102, 104,106,108 so that the images 12,14,16,18 projected by each projection device 102, 104,106,108 precisely align on the display surface 10. Precise alignment of the projected images 12,14,16,18 ensures that the complete image 41, is without gaps, spaces or borders (For example, there exists no gap between image 12 and any of the other images 14,16,18). Using the position information provided by the detector 22, the controller 24 adjusts each projection device 102,104,106,108 so that each projection device 102,104, 106,108 projects an image to a desired position on the display surface 10. The controller 24 adjusts each projection device 102,104, 106, 108 in a similar manner as previously described (i.e., by adjusting AC actuation signal actuation signals used to oscillate the MEMS micro-mirror 132, to include a DC off-set), to achieve alignment of the projected images 12,14,16,18.

As well as adjustment of the projection devices for image size and position, the controller 24 may further adjust each projection device 102,104,106,108 such that the brightness of each image projected by each projection device 102,104, 106,108 is the same. This is particularly useful when the images projected by each projection device 102,104,106,108 are to be aligned rather than overlapped, as it allows for the complete image 41 visible on the projection display surface 10 to have a uniform brightness.

Based on the brightness of each image 12,14,16,18 detected by the detector 22, the controller 24 can determine the adjustment required for each projection device 102,104, 106,108 such that each projection device 102,104,106,108 projects an image at a predetermined brightness. The predetermined brightness may be the average of the brightness of all the projected images 12,14,16,18 detected by the detector 22. The controller 24 adjusts the light source 120 within the projection device 102 to increase or decrease the brightness of the projected light to the predetermined brightness. For projection devices 104,106,108 the controller 24 sends adjustment commands to each of the projection devices 104,106,108 which when executed adjusts the light sources 120 within each of the projection devices 104,106, 108 to increase or decrease the brightness of the projected light to the predetermined brightness.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

What is claimed:

1. A projector system, comprising:
a plurality of mobile devices, each mobile device comprising:
a projector to project an image onto a display surface, each projector comprising:
at least one light source; and
at least one mirror to deflect light from the at least one light source to the display surface;
a detector to detect images projected onto the display surface by at least one of the projectors; and
a controller to detect one or more characteristics of the images detected by the detector; and
for a given mobile device of the plurality of mobile devices, the controller to be a master controller and for a remainder of the plurality of mobile devices the corresponding controllers to be slave controllers, the master controller to adjust a control for at least one mirror of at least one of the projectors in at least one of the mobile devices comprising one of the slave controllers, the master controller to adjust the control based on the one or more characteristics.

2. The projector system of claim 1, wherein the mobile devices are positionable at different orientations relative to each other.

3. The projector system of claim 1, wherein at least one detector is a CCD camera, a CMOS camera, or a photodiode.

4. The projector system of claim 1, wherein the mobile devices are mobile phones.

5. The projector system of claim 1, wherein the at least one mirror includes a micro-electrical mechanical system (MEMS) mirror.

6. The projector system of claim 1, wherein each projector comprises a plurality of light sources selected from red laser, green laser, and blue laser.

7. The projector system of claim 6, wherein each projector further comprises a beam combiner positioned to receive light from each of the light sources and generate a single combined beam.

8. The projector system of claim 7, wherein each projector further comprises a beam splitter positioned to receive the single combined beam from the beam combiner.

9. The projector system of claim 8, wherein each projector comprises two mirrors positioned to receive light from the beam splitter and deflect the light to the display surface.

10. The projector system of claim 1, wherein the master controller is wirelessly coupled to the at least one of the projectors.

11. A projector system, comprising:
a plurality of mobile devices, each mobile device comprising:
a projector to project an image onto a display surface, each projector comprising:
at least one light source; and
at least one mirror to deflect light from the at least one light source to the display surface;
a detector to detect images projected onto the display surface by at least one of the projectors; and
a controller to detect one or more characteristics of the images detected by the detector; and
for a first mobile device of the plurality of mobile devices, the controller to be a master controller and for a second mobile device of the plurality of mobile devices the corresponding controller to be a slave controller, the master controller to adjust a control for the at least one mirror of the corresponding projector of the second mobile device, the master controller to adjust the control based on the one or more characteristics.

12. The projector system of claim 11, wherein the master controller is to control the projector of the first mobile device to project a first image onto the display surface and to control the corresponding projector of the second mobile device to project a second image onto the display surface, the second image intermeshed with the first image.

13. The projector system of claim 12, wherein:
the first image and the second image form a combined image on the display surface; and
the master controller is to control the projector of the first mobile device and the corresponding projector of the second mobile device to project successive pixels of the combined image alternately by the projector and the corresponding projector.

14. The projector system of claim 11, wherein:
at least one of the detectors is further to detect an interaction with the image projected onto the display surface; and
the master controller is further to adjust a corresponding control for at least one mirror of at least one of the corresponding projectors based on the interaction.

15. The projector system of claim 14, wherein the interaction comprises a corresponding interaction of a pointer with the image.

16. The projector system of claim 14, wherein the interaction comprises one or more of:
a tactile interaction of a user with the image; and
a gesture interaction of the user with the image.

17. The projector system of claim 11, wherein:
at least one of the detectors is further to detect a corresponding characteristic of the display surface; and
the master controller is further to adjust a corresponding control for at least one of the corresponding projectors based on the corresponding characteristic of the display surface.

18. The projector system of claim 17, wherein the corresponding characteristic of the display surface comprises one or more of:
a color of the display surface; and
a physical surface characteristic of the display surface.

19. The projector system of claim 11, wherein:
at least one of the detectors is further to detect an obstacle in a projection path of the corresponding projector; and
the master controller is further to adjust a corresponding control for at least one mirror of the corresponding projector based on the detection of the obstacle.

20. A method comprising:
projecting a plurality of images onto a display surface using a corresponding plurality of mobile devices, for each of the plurality of mobile devices the projecting comprising:
operating a respective light source to generate a light; and
operating a respective mirror to deflect the light from the light source onto the display surface to form the corresponding image;
detecting at least one of the images projected onto the display surface, the detecting comprising using a detector of at least one of the mobile devices;
detecting at least one characteristic of the at least one image detected by the detector, the detecting the at least one characteristic comprising using a controller of at least one of the mobile devices;
designating a corresponding controller of a first one of the plurality of mobile devices as a master controller;

designating a corresponding controller of a second one of the plurality of mobile devices as a slave controller; and adjusting a control for a corresponding mirror of the corresponding projector of the second mobile device based on the at least one characteristic, the adjusting comprising the master controller adjusting the control.

* * * * *